May 24, 1960 K. ALTENBURGER 2,937,905
SPOKE CONNECTION FOR TUBELESS TIRE RIM
Filed Nov. 23, 1956 3 Sheets-Sheet 1
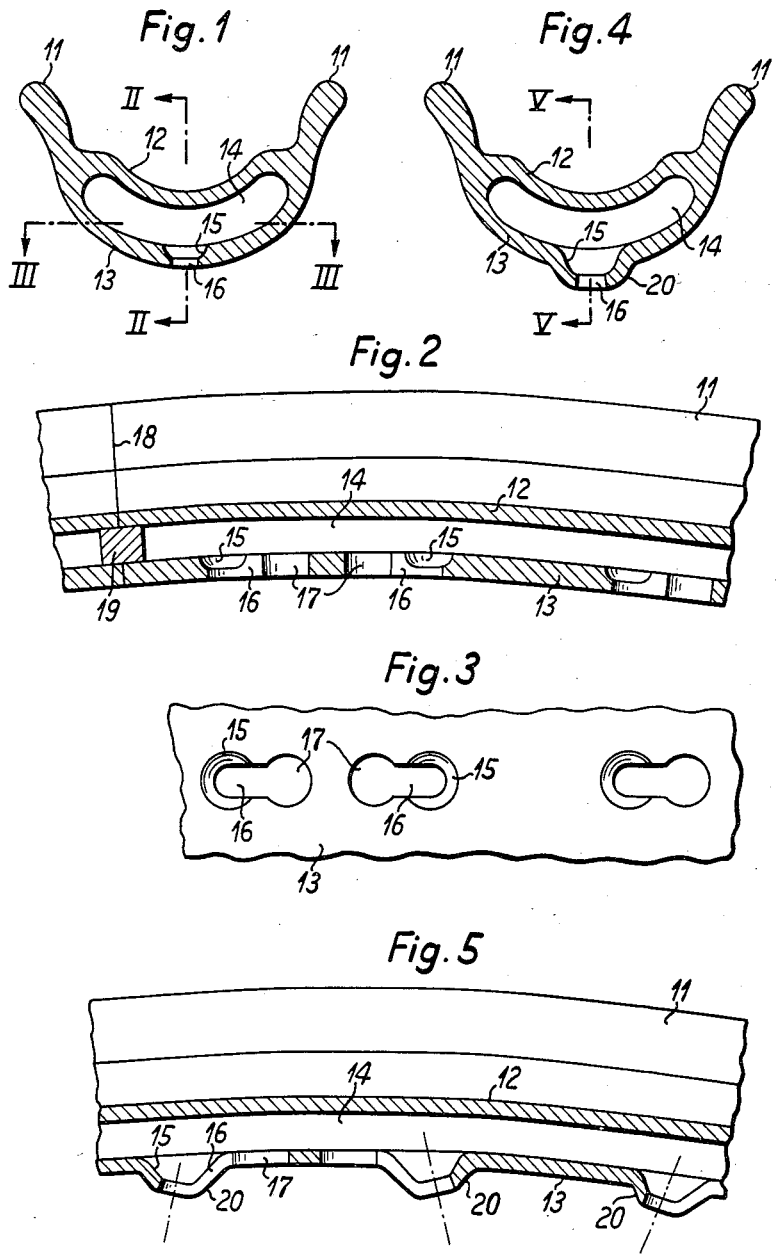
INVENTOR
KARL ALTENBURGER
BY
WATSON, COLE, GRINDLE & WATSON May 24, 1960  K. ALTENBURGER  2,937,905
SPOKE CONNECTION FOR TUBELESS TIRE RIM
Filed Nov. 23, 1956
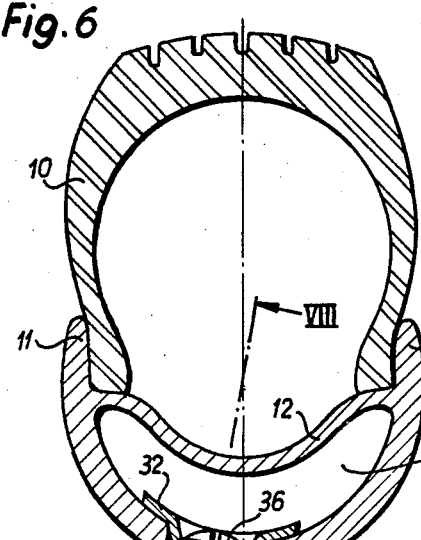
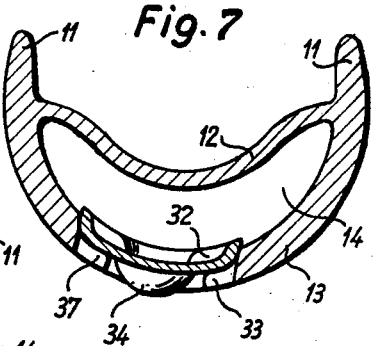
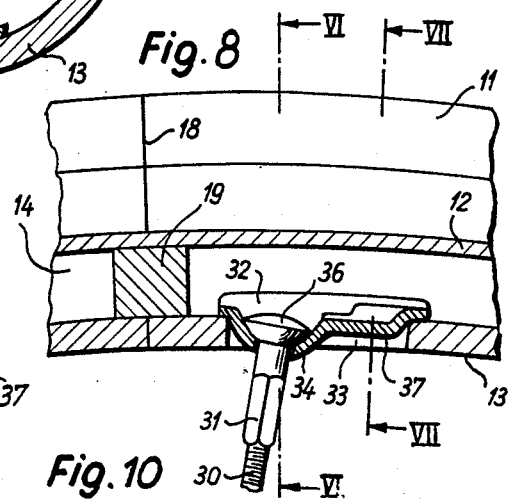
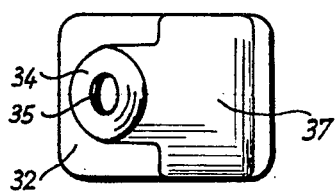
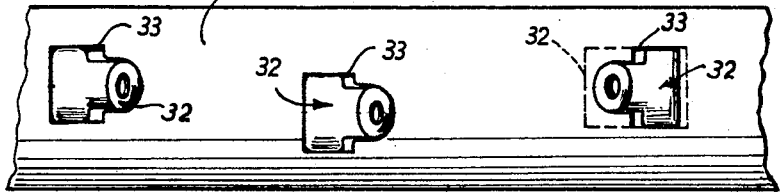
INVENTOR
KARL ALTENBURGER
BY
WATSON, COLE, GRINDLE + WATSON

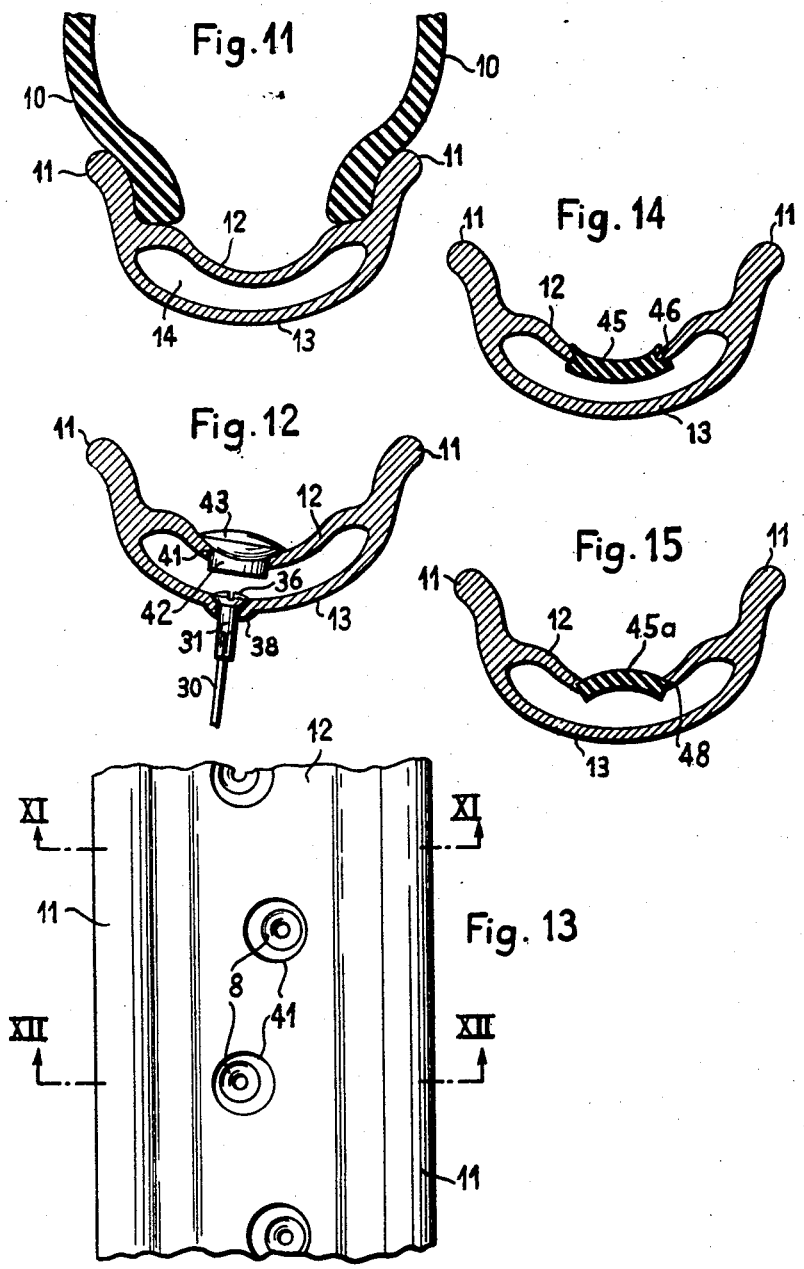

United States Patent Office

2,937,905
Patented May 24, 1960

2,937,905

SPOKE CONNECTION FOR TUBELESS TIRE RIM

Karl Altenburger, Jestetten, Baden, Germany

Filed Nov. 23, 1956, Ser. No. 623,829

Claims priority, application Switzerland Nov. 29, 1955

5 Claims. (Cl. 301—58)

The present invention relates to a tubeless pneumatic tyre for spoke wheels, especially for use on cycles and motor-cycles. The pneumatic tyre according to the invention is principally characterized by a rim having between its two usual circumferential flanges an inner bottom to which spokes are anchored and, at a distance therefrom, an outer bottom forming the inwardly directed wall of the air chamber.

Further features of the invention will appear from the following description, taken in conjunction with the accompanying drawing which shows, by pure way of example, some constructional forms incorporating the invention.

Fig. 1 shows a sectional view of a first form of a rim for a tubeless pneumatic tyre;

Fig. 2 is a sectional view in circumferential direction of the rim, taken on the line II—II of Fig. 1;

Fig. 3 shows a sectional fragmentary part of the same rim, taken on the line III—III of Fig. 1;

Fig. 4 is a sectional view of a second form of the rim for a tubeless pneumatic tyre;

Fig. 5 shows a sectional view in circumferential direction, taken on the line V—V of Fig. 4;

Fig. 6 is a sectional view of a spoke wheel with tubeless pneumatic tyre according to a third form, taken on the line VI—VI of Fig. 8;

Fig. 7 is a similar cross-section taken on the line VII—VII of Fig. 8, the rubber tyre and spokes being omitted with respect to Fig. 6;

Fig. 8 shows a sectional view in circumferential direction of the wheel, taken on the line VIII—VIII of Fig. 6, the rubber tyre being omitted;

Fig. 9 represents a single anchoring element of the same wheel;

Fig. 10 represents a fragmentary part of the wheel as seen from inside in radial direction, shown on a reduced scale with respect to Figs. 6–9, the spokes being omitted for the sake of clarity;

Fig. 11 shows a fragmentary sectional view of a fourth form of a tubeless pneumatic tyre, taken on the line XI—XI of Fig. 13;

Fig. 12 represents a similar sectional view taken on the line XII—XII of Fig. 13, the rubber tyre being omitted;

Fig. 13 shows a fragmentary part of the rim alone, as seen from outside;

Fig. 14 is a sectional view of a fifth form of the rim for a pneumatic tyre with rubber tyre omitted;

Fig. 15 is the similar representation of a sixth form.

With reference to Figs. 1–3 the rim shown has the usual circumferential flanges 11 with a rubber tyre put on in known manner as represented for instance in Fig. 6 and designated 10. With respect to the rotary axis of the rim, the flanges 11 are interconnected by an outer bottom 12 and an inner bottom 13. These two bottoms 12 and 13 are arranged between the flanges 11 and are at a distance apart so that the rim includes an annular hollow space 14. The outer rim 12 is completely closed, i.e. it has no openings, except at the place where a valve member (not shown) is provided for inflating the tyre. The bottom 12 may therefore be readily utilized for limiting the air chamber towards the interior without there being any danger of air leakage. Hence within the rubber tyre no tube is necessary.

The inner bottom 13 is only adapted for anchoring the spokes (not shown). For this purpose the inner bottom 13 possesses, on its side facing the outer bottom 12 and distributed along the whole circumference of the rim, spherically recessed seatings 15 for spoke nipple heads with spherically shaped bearing shoulders. Each of these seatings 15 is arranged at one end of an oblong hole 16 in the inner bottom 13, the other end of which merges into a larger opening 17. The opening 17 permits of inserting and removing the nipple head, whereas the oblong hole only allows of the nipple shaft being passed. Spoke nipples of the kind referred to are known per se as exemplified in Fig. 6 and designated 31. For inserting a spoke nipple 31, at first its head 36 (Fig. 6) is passed through one of the openings 17 and then the nipple is displaced in the oblong hole 16 until its head can be inserted into the corresponding seating 15.

In the form shown, the oblong holes run in the circumferential direction of the rim, but they extend alternately from the seatings 15 in opposite directions as visible from Figs. 2 and 3. Crossing spokes are anchored with their nipples in seatings 15 from which the oblong holes 16 extend away from each other. According to the type of crossing of the spokes it may be preferable to have the oblong holes 16 at two or four successive seatings 15 directed in the same manner, and then in opposition in the following two or four seatings 15. In the form according to Figs. 1–3 the seatings 15 are milled into the material of the inner bottom 13. The milling tool required therefor is introduced through the openings 17 one after the other and then moved to the other end of the related oblong hole 16, whereupon the machining of the seating 15 takes place.

The rim is made of an originally straight piece of hollow sectional material which has been suitably bent until its ends abut on each other. The parting thus resulting between the two ends of the sectional piece is designated 18 in Fig. 2. At the position of the parting line 18 a piece 19 is inserted which engages the hollow space 14 at both ends of the sectional piece and completely fills the cross-section of the hollow space 14. The abutting ends of the sectional piece are welded to each other and to the insert 19. In this manner an airtight weld is ensured at the butt joint 18 and air is prevented from escaping from the air chamber of the tubeless tyre.

The insert 19 involves another advantage in that it may be utilized to balance the weight of the valve member. For this purpose the two bottoms 12 and 13 of the rim each have an aperture for taking the valve at a location situated diametrically opposite the insert 19. The weight of the insert 19 is then made equal to that of the valve. In this way the wheel can be well balanced.

In the form according to Figs. 4 and 5 the seatings 15 for the heads of the spoke nipples are formed by recesses 20 (as made by punching) on the inner bottom 13. Like the milling cutter in the first form, the stamp for making the recesses 20 is introduced through the openings 17 and oblong holes 16. Fig. 5 shows that the recesses 20 may be formed obliquely to suit the intended run of the spokes.

In the two forms shown, there is the practical important advantage that one spoke or one spoke nipple may be changed for another without the rubber tyre having to be removed.

The openings 17 and the portion of the oblong holes 16 not filled up by the spoke nipples may be closed by plugs (not shown) made of rubber or rubber-like synthetic material to prevent water and dirt entering the hollow space 14 of the rim.

The aforedescribed rims preferably consist of light metal.

Alternatively instead of having the oblong holes 16 running in circumferential direction, it would be possible to arrange them running transversely to it. Further it is possible to have the seatings 15 for the nipple heads arranged in two rows instead of one single row, as is often done in the case of the conventional rims, in order that the spokes situated at the left and right sides of the wheel need not be inclined to the inner bottom less considerably with respect to the vertical.

The rim of the spoke wheel as illustrated in Figs. 6–10 principally differs from the aforedescribed forms only by another anchoring of the spokes 30 on the inner rim-bottom 13 of the wheel. In this case the anchoring is effected on the one hand by means of the spoke nipples 31 known per se, and on the other hand by anchor elements 32. For each spoke 30 there is provided such an anchor element 32 which is located in the hollow space 14 of the rim and supported against the inner bottom 13 to prevent it passing out. The plate-shaped anchor elements 32 each have an aperture 33 in the inner bottom 13, through which the removable anchor element is introduced into the hollow space 14. The aperture 32 comprises a rectangular portion through which the anchor element 32 is pushed, and an adjoining semi-circular portion of less width.

The anchor elements 32 are all formed exactly alike with a hemispherical recess 34 and a bore 35 through which the appertaining spoke nipple 31 is passed. The recess 34 constitutes a seat for the spherical bearing shoulder of the nipple head 36. In the position of the anchor element as shown in Figs. 6, 7, 8 and 10, the recess 34 engages the hemispherical portion of the appertaining aperture 33, while another recess 37 thereof engages the rectangular portion of the aperture 33 to thus prevent the anchor element swiveling round the recess 34.

As is well-known, the spokes on cycles, motor-cycles and similar vehicles are interlaced so that they cross each other and are not directed radially to the wheel. In accordance with the interlacing of the spokes, the apertures 33 are alternately reversed so that the semi-circular portion of the apertures is situated beside the rectangular portion thereof, partly in one peripheral direction of the rim and partly in the other direction, as shown for instance in Fig. 10. In this figure it is assumed that the spokes to be fixed into the two anchor elements 32 cross each other, and that the spoke to be fixed into the intermediate anchor element crosses with another spoke which is fixed to an anchor element (not shown) located still further to the right. By the pull exerted by the non-radially directed spokes, the anchor elements 32 are thus in any case drawn in a direction against the semi-circularly shaped bounding of the respective aperture 33.

If a spoke nipple of the wheel has to be changed, this may be effected without the rubber tyre 10 being removed from the rim, and without the air being allowed to escape from the air chamber. The nipple 31 to be changed is unscrewed from the respective spoke 30 and then, with the nipple always held firmly, the related anchor element 32 of Fig. 8 is pushed somewhat to the left, until its end lying at the right can be pushed through the rectangular portion of the aperture 33. Now, by setting it slightly obliquely, the whole anchor element 32 together with the nipple 31 may be completely removed through the aperture 33. The anchor element may conveniently be displaced by means of the nipple. With anchor element 32 detached from the rim, the nipple 31 may be changed for another, whereupon the anchor element is re-inserted into the rim, together with the new nipple.

The anchor elements 32 serve not only for anchoring the spoke nipples, but also for sealing the apertures 33 in the inner rim-bottom to prevent dirt and water from entering.

In the form according to Figs. 11–13, the nipples 31 of the wheel spokes 30 are anchored watertight on the inner bottom 13 of the rim, as shown in Fig. 12. For this purpose, the inner rim-bottom 13 has recesses 38 each with a hemispherical seating surface stamped thereinto for the spoke nipple 31. The spoke nipples 31 have heads 36 exhibiting a spherical bearing shoulder whose radius of curvature corresponds to that of the seating surface in the respective recess 38. Each nipple head 36 fills the appertaining recess almost completely. By such design of the spoke nipples 31 and recesses 38, a watertight seal will be ensured between the spoke nipples 31 and the inner rim-bottom 13, even when the spokes 30 and consequently the axis of the nipples 31 are not directed radially to the tyre because of the crossing of the spokes. Undesired infiltration of water into the hollow space of the rim is thus prevented in an efficient way.

To produce the recesses 38 in the inner rim-bottom 13 and to introduce and tighten the nipples 31 therein, the outer rim-bottom 13 is provided with several openings 41 which in number correspond to that of the recesses. Said openings are disposed opposite the recesses or spoke nipples. After introducing and tightening the spoke nipples 31, into each of said openings a plug 42 will be inserted which preferably consists of some resilient material such as rubber or thermoplastic synthetic substance, to seal the opening 41 airtight. Said plug has an edge 43 extending over the circumferential edge of the related opening 41. The outer bottom 12 of the rim forms the inwardly directed wall of the air chamber, the other wall of which is formed by the rubber tyre 10. In service condition, due to the overpressure prevailing in the air chamber, the edge 43 of each plug 42 is pressed against the outer bottom 12, thus increasing the seal of the openings 41.

For inflating the pressure space there is provided a valve member (not shown) inserted airtight into the outer bottom 12 and passing watertight through the inner bottom 13.

When in the case of repairs the nipples 31 have to be changed for others, this may be effected with the rubber tyre 10 removed and the plugs 42 taken out.

In the form according to Fig. 14, the outer rim-bottom 12 has, instead of openings 41 separate from each other, one continuous slot running in the circumferential direction of the rim, which allows of producing the recesses for the spoke nipples and of introducing and tightening them. Said slot is sealed airtight by a band-like sealing member 45, the two ends of which abut on each other at the valve (not shown) of the pneumatic tyre. Each of the two edges of the slot includes a projecting longitudinal rib 46 adapted to engage a suitable longitudinal groove in the sealing member 45. The sealing member 45 is a sectional piece preferably consisting of some resilient material such as rubber or thermoplastic synthetic substance. In the case of repairs on the wheel, the band-like sealing member 45 may be removed and afterwards inserted again, whereby it may be pulled out or pushed in again in circumferential direction, for instance at the location of the valve. If the member 45 can be flexibly deformed easily enough, it may also be removed out of the slot in the bottom 12 in the radial direction of the tyre, or be re-inserted into that slot.

A similar form is illustrated in Fig. 15, wherein the rim has again a continuous slot in the outer bottom 12 in the circumferential direction. Also in this case the slot is sealed by a band-like member 45a consisting of some flexible material. Each of the two longitudinal sides of the slot is provided with a longitudinal groove 48 which is engaged by a suitably formed member 45a of arcuate cross-section. Because of this the overpressure in the air chamber exerted on the member 45a tends to flatten it so that its edges will be more strongly urged against the slot, to increase the tightness between the bottom 12 and the sealing member 45a.

It is understood that the edges of the sealing member 45 and 45a respectively in Figs. 14 and 15 may also be provided with several interengaging ribs or grooves.

In certain forms (not shown) modified with respect to those of Figs. 14 and 15, the band-like sealing members 45 and 45a may have longitudinal edges projecting beyond the longitudinal edges of the slot in bottom 12 in such a way that the former edges will be urged against the bottom 12 due to the action of the pressure in the air chamber, to increase the tightness of the seal.

In a modification (not shown) of the form according to Figs. 11–13, instead of the plugs 42 some band-like sealing members could be provided to detachably seal several of the openings 41. These sealing members could be provided at one end with plug-like projections fitting into the separate openings.

The openings 41 and the slot in bottom 12 could possibly also be pasted over with an airtight band-like sealing member which may again be drawn off the bottom 12 later, if necessary.

The aforedescribed tubeless pneumatic tyre is suitable for spoke wheels of every kind, say, for use on cycles, motor-cycles, Mopeds, etc.

What I claim is:

1. In a wheel with a tubeless pneumatic tire and spokes, especially for use on bicycles and motorcycles, a hollow rim having two circumferential flanges between which an outer and an inner bottom are provided, said rim being composed of a seamless hollow sectional piece, said flanges being solid and the spokes of the wheel being provided with spoke nipples each with a head and which are anchored at said inner bottom of the rim, said outer bottom being sealed airtight and adapted to serve directly as the inwardly directed wall of the air chamber of the tire, and an anchor element with a bore therein provided in the hollow between the two rim bottoms for each spoke, said anchor element having a seating for the respective spoke-nipple head and supported against the inner rim bottom and covering an aperture which allows the anchor element together with the respective spoke nipple to be pushed therethrough from the radially inwardly directed side of the rim for removal and insertion of the spoke and spoke nipple.

2. In a wheel with a tubeless pneumatic tire and spokes, especially for use on bicycles and motorcycles, a hollow rim having two circumferential flanges between which an outer and an inner bottom are provided, said rim being composed of a seamless hollow sectional piece, said flanges being solid and the spokes of the wheel being provided with spoke nipples each with a head and which are anchored at said inner bottom of the rim, said outer bottom being sealed airtight and adapted to serve directly as the inwardly directed wall of the air chamber of the tire, and an anchor element with a bore therein provided in the hollow between the two rim bottoms for each spoke, said anchor element having a seating for the respective spoke-nipple head and supported against the inner rim bottom and covering an aperture which allows the anchor element together with the respective spoke nipple to be pushed therethrough from the radially inwardly directed side of the rim for removal and insertion of the spoke and spoke nipple, and each anchor element being of platelike design and provided with a hemispherical recess forming the seat for its spoke nipple with spherical bearing shoulders.

3. In a wheel with a tubeless pneumatic tire and spokes, especially for use on bicycles and motorcycles, a hollow rim having two circumferential flanges between which an outer and an inner bottom are provided, said rim being composed of a seamless hollow sectional piece, said flanges being solid and the spokes of the wheel being provided with spoke nipples each with a head and which are anchored at said inner bottom of the rim, said outer bottom being sealed airtight and adapted to serve directly as the inwardly directed wall of the air chamber of the tire, and an anchor element with a bore therein provided in the hollow between the two rim bottoms for each spoke, said anchor element having a seating for the respective spoke-nipple head and supported against the inner rim bottom and covering an aperture which allows the anchor element together with the respective spoke nipple to be pushed therethrough from the radially inwardly directed side of the rim for removal and insertion of the spoke and spoke nipple, each anchor element being of plate-like design and provided with a hemispherical recess forming the seat for its spoke nipple with spherical bearing shoulders, and each aperture having a semicircular opening and a recess for its respective anchor element and having an adjoining rectangular section through which the anchor element may be forced.

4. In a wheel with a tubeless pneumatic tire and spokes, especially for use on bicycles and motorcycles, a hollow rim having two circumferential flanges between which an outer and an inner bottom are provided, said rim being composed of a seamless hollow sectional piece, said flanges being solid and the spokes of the wheel being provided with spoke nipples each with a head and which are anchored at said inner bottom of the rim, said outer bottom being sealed airtight and adapted to serve directly as the inwardly directed wall of the air chamber of the tire, and an anchor element with a bore therein provided in the hollow between the two rim bottoms for each spoke, said anchor element having a seating for the respective spoke-nipple head and supported against the inner rim bottom and covering an aperture which allows the anchor element together with the respective spoke nipple to be pushed therethrough from the radially inwardly directed side of the rim for removal and insertion of the spoke and spoke nipple, and each anchor element being of plate-like design and provided with a hemispherical recess forming the seat for its spoke nipple with spherical bearing shoulders, each aperture having a semicircular opening and a recess for its respective anchor element and having an adjoining rectangular section through which the anchor element may be forced, and each anchor element also comprising a recess to engage the rectangular section of the related aperture to prevent swivelling out of place thereof.

5. In a wheel with a tubeless pneumatic tire and spokes, especially for use on bicycles and motorcycles, a hollow rim having two circumferential flanges between which an outer and an inner bottom are provided, said rim being composed of a seamless hollow sectional piece, said flanges being solid and the spokes of the wheel being provided with spoke nipples each with a head and which are anchored at said inner bottom of the rim, said outer bottom being sealed airtight and adapted to serve directly as the inwardly directed wall of the air chamber of the tire, and an anchor element with a bore therein provided in the hollow between the two rim bottoms for each spoke, said anchor element having a seating for the respective spoke-nipple head and supported against the inner rim bottom and covering an aperture which allows the anchor element together with the respective spoke nipple to be pushed therethrough from the radially inwardly directed side of the rim for removal and insertion of the spoke and spoke nipple, and each anchor element being of plate-like design and provided with a hemispherical recess forming the seat for its spoke nipple with spherical bearing shoulders, each aperture having a semicircular opening and a recess for its respective anchor element and having an adjoining rectangular section through which the anchor elements may be forced, and the apertures of the inner rim-bottom being disposed in alternately reversed order corresponding to the interlacing of the spokes so that the semicircular section of the apertures is in front of the same apertures, partly in one direction of the circumference of the rim and partly in the other direction.

References Cited in the file of this patent

UNITED STATES PATENTS

| | | |
|---|---|---|
| 335,590 | Jeffery | Feb. 9, 1886 |
| 365,091 | Owen | June 21, 1887 |
| 383,129 | Jeffery | May 22, 1888 |
| 576,836 | Culley | Feb. 9, 1897 |
| 646,306 | Muller | Mar. 27, 1900 |

FOREIGN PATENTS

| | | |
|---|---|---|
| 2,536 | Great Britain | of 1898 |
| 1,012,963 | France | Apr. 23, 1952 |
| 1,045,279 | France | June 24, 1953 |